United States Patent [19]

Smith

[11] 3,957,165

[45] May 18, 1976

[54] STRADDLE CARRIERS

[75] Inventor: Richard Terence Smith, Wolverhampton, England

[73] Assignee: Rubery Owen Mechanical Equipment, Staffordshire, England

[22] Filed: Dec. 19, 1974

[21] Appl. No.: 534,307

[30] Foreign Application Priority Data

Dec. 20, 1973 United Kingdom .............. 59266/73

[52] U.S. Cl. .............................. 214/394; 180/77 S; 180/89 R; 296/28 C

[51] Int. Cl.² ........................................ B60P 3/00

[58] Field of Search .................... 214/392, 394, 396; 296/28 C; 180/77 S, 89 R

[56] References Cited

UNITED STATES PATENTS

| | | | |
|---|---|---|---|
| 3,396,861 | 8/1968 | Houlton | 214/392 |
| 3,721,077 | 3/1973 | Van Der Lely | 180/89 X |

*Primary Examiner*—Robert G. Sheridan

*Attorney, Agent, or Firm*—Scrivener Parker Scrivener and Clarke

[57] ABSTRACT

A straddle carrier has a control cab which is movable between a lowered position at or near ground level at which it is readily accessible for the operator to enter and leave the cab and for servicing, and an elevated position from which the carrier can be controlled in use. Preferably the carrier can also be controlled in use from the control cab when the cab is in the lowered position.

17 Claims, 7 Drawing Figures

STRADDLE CARRIERS

This invention relates to vehicles of the type known as straddle carriers. Such vehicles, which are used for handling containers and other large and heavy loads, generally comprise an arch type frame set transversely at each end, the two frames being connected together in parallel spaced relationship by longitudinal side members. The whole structure is supported by wheels, generally one wheel, or a pair of wheels, at each corner. Some or all of the wheels may be power driven and the wheels at one end, at least, are steerable. Power operated means are provided for engaging, raising and lowering loads to be carried by the vehicle. A control cab is provided from which the operator controls movements of the vehicle and picking up and setting down of loads.

Hitherto the control cab has been at a fixed, elevated level. Ladders and walkways give access to the cab for the operator and for maintenance of the cab equipment and controls. Such ladders and walkways, which frequently stand proud of the side of the vehicle, are vulnerable to accidental damage, particularly when the vehicle is working in narrow lanes between rows of containers.

The present invention consists in a straddle carrier wherein a control cab is provided which is movable by selectively operable power means between at least two alternative positions of which one is an elevated position from which the straddle carrier is controlled when in use and the other is a lowered position to which the control cab is located at or adjacent to ground level where it is available for access and servicing.

The power means may comprise a main power means and a subsidiary power means each operable to move the cab over a part of its full range of movement.

The control cab is conveniently carried by structure of the straddle carrier at one side of the carrier and normally lies within vertical planes containing the sides of the carrier.

Control means for the power means may be operable for variably controlling the speed of raising and lowering of the cab. The control means may also selectively and alternatively control the steering of the carrier.

Preferably locking means is provided for positively locking the cab in its elevated position. The locking means is released when the power means is operated to move the cab from that position.

Emergency means may be provided operable at least from within the cab for releasing the locking mechanism when provided and for causing or allowing the lowering of the cab at a controlled speed. The emergency means is preferably also arranged to be operated from a position outside the cab at or near ground level.

It is desirable for there to be control of the maximum lowering speed of the cab in order to protect the operator in the event of failure of a part of the mechanism. Shock absorbing means may be incorporated to absorb energy and reduce impact loads as the cab reaches its lowered position.

There may be provision for disabling the transmission and lifting mechanism of the straddle carrier during raising and lowering of the cab so that the carrier cannot be set in motion or loads moved whilst the cab is moving between its alternative positions.

The cab may be mounted for rotation in a substantially horizontal plane so as to allow the operator to vary his field of view according to the work in hand.

One embodiment of the invention will now be described, by way of example only, with reference to the accompanying drawings, in which.

Figure 3:
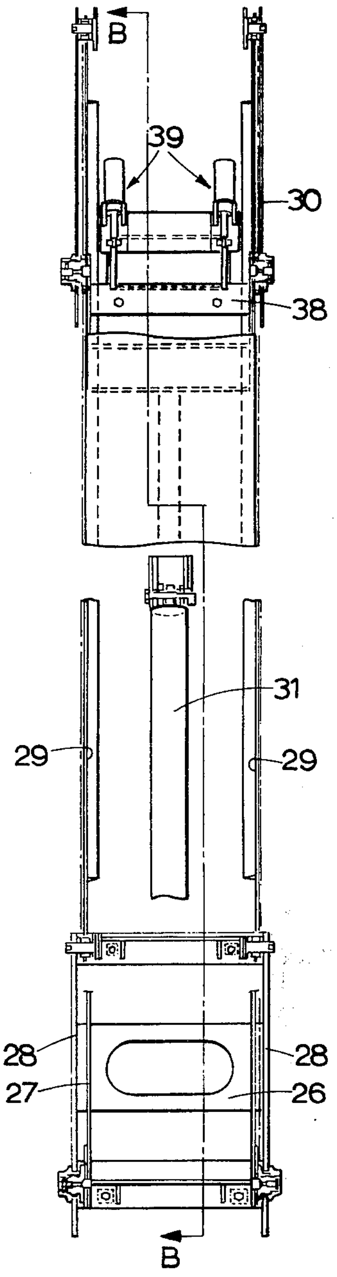
Figure 4:
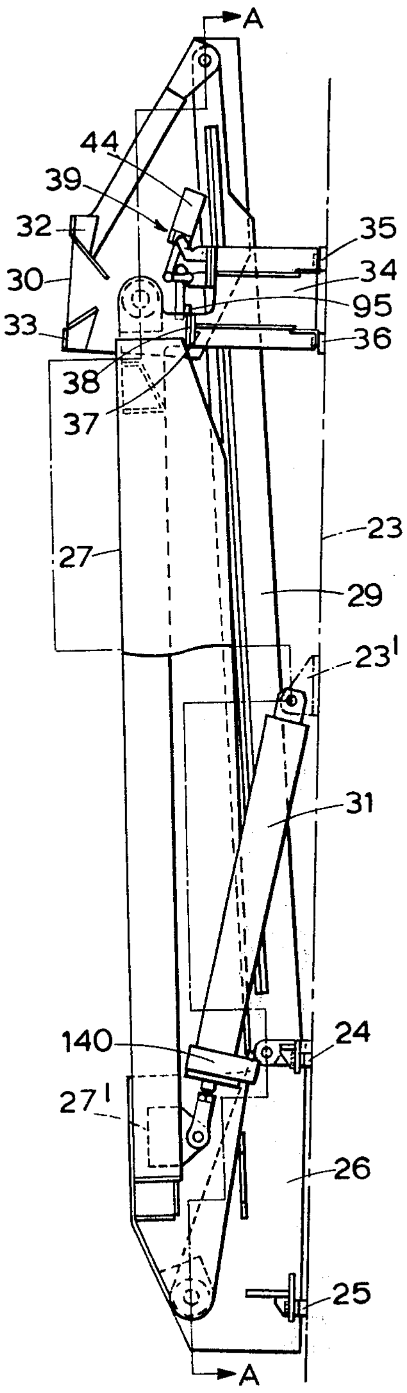
Figure 5:
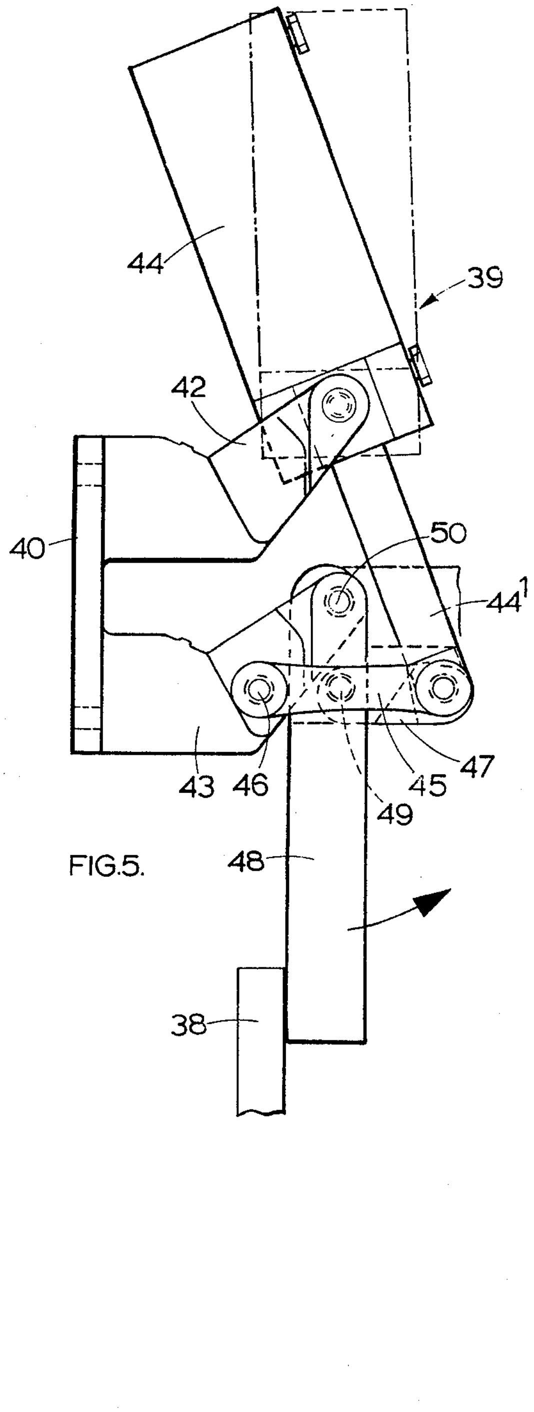
Figure 6:
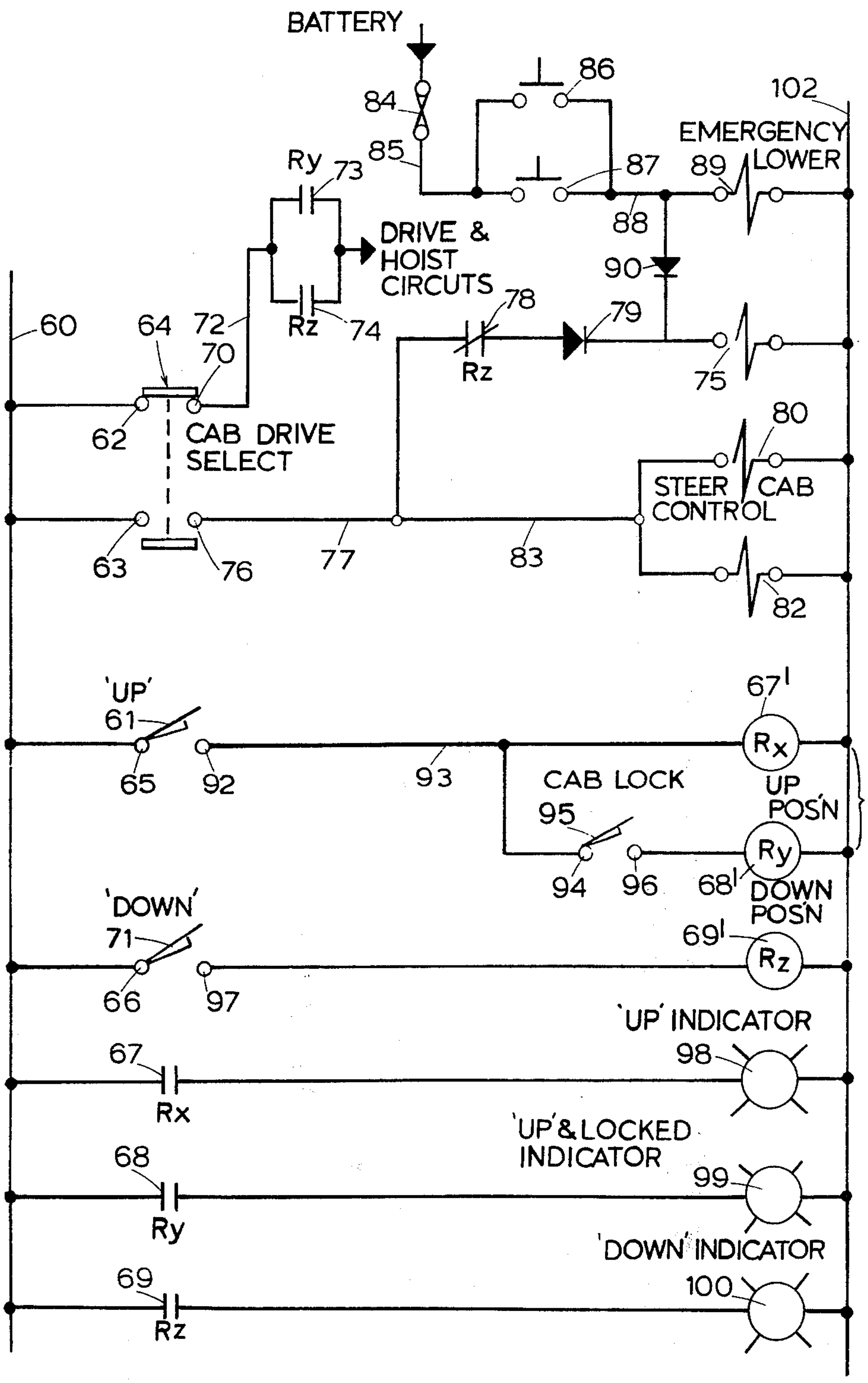
Figure 7:
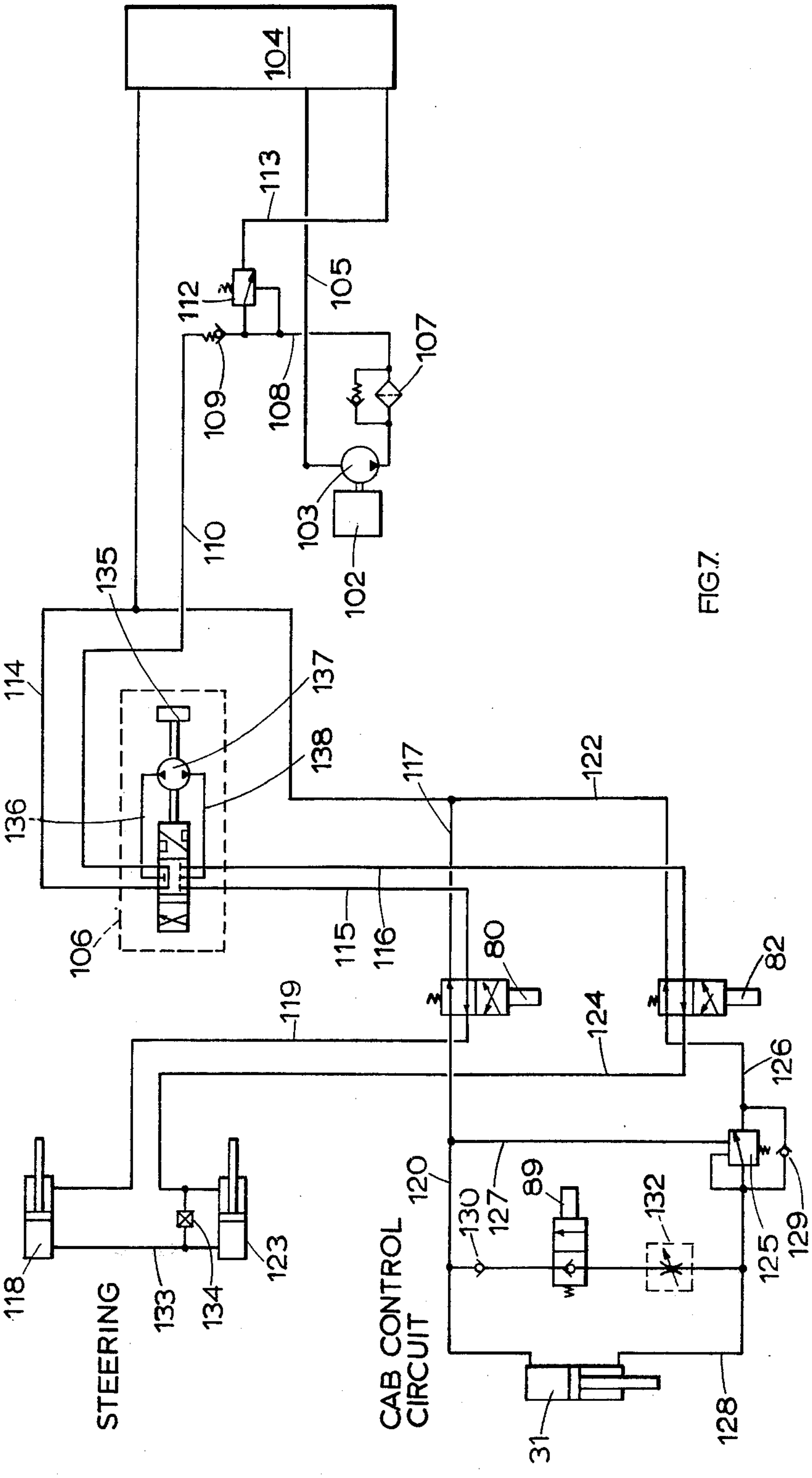

FIG. 3 is a partly sectioned, enlarged front elevation of a cablifting mechanism, the section being taken on line A—A of FIG. 4, FIG. 4 is a partly sectioned, enlarged side view of the mechanism of FIG. 3, the section being taken on line B—B of FIG. 3, FIG. 5 is an enlarged side view of a cab-locking assembly, and FIGS. 6 and 7 are diagrams respectively of electrical and hydraulic circuits for controlling the cab-lifting mechanism.

Figure 1:
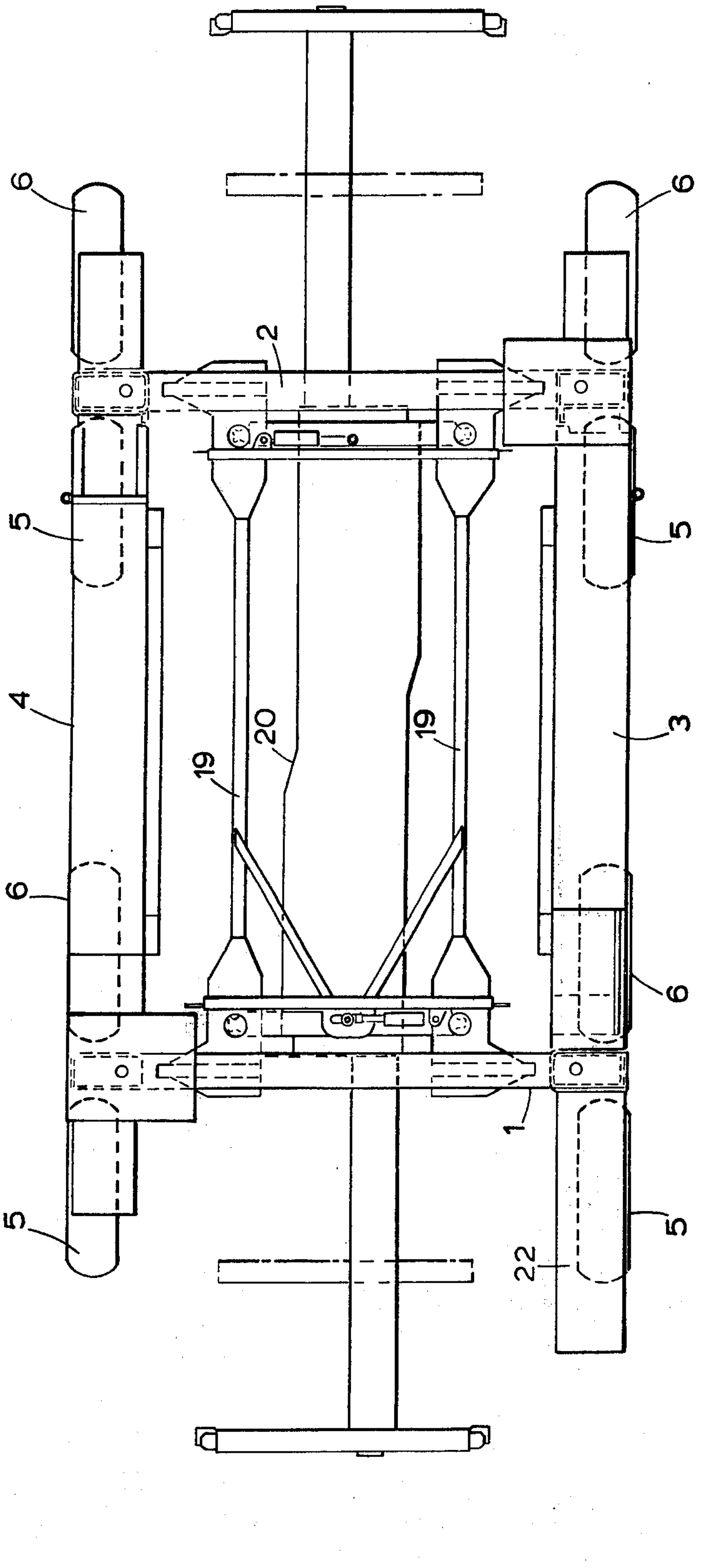
FIG. 1 is a simplified plan view of a straddle carrier.
Figure 2:
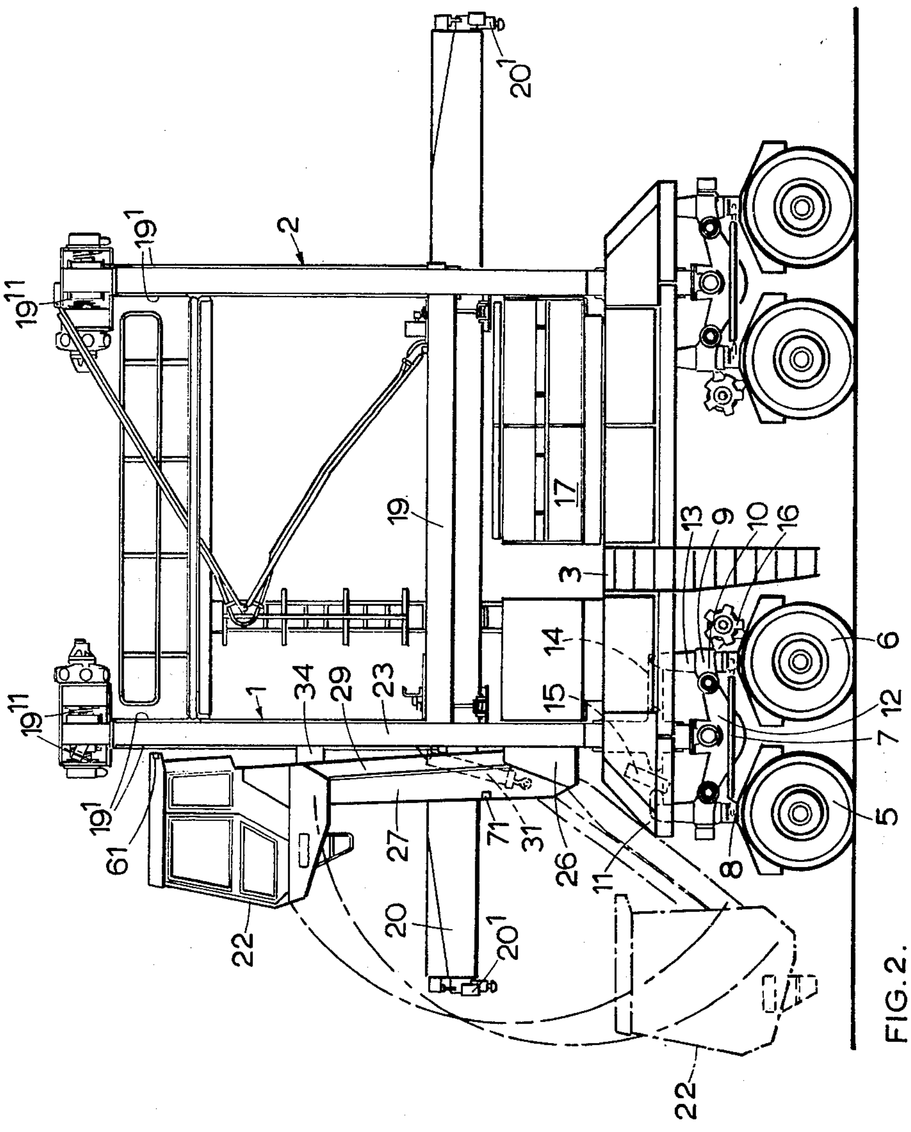
FIG. 2 is a side view of the straddle carrier including the control cab.

Referring to FIGS. 1 and 2, front and rear arch type frames 1, 2 are connected together by longitudinal side members 3, 4. Pairs of wheels 5, 6 at each corner carry the structure of the straddle carrier. Each pair of wheels is connected together for steering about vertical axes by a tie rod 7, FIG. 2. Each wheel is carried in a stirrup 8 rotatably mounted in a carrier 9. The carriers 9 have lugs 10 through which they are pivotally connected one to each end of a beam 12. The beam 12 is pivotally connected centrally to the lower end of a leg 23 of the arch frame 1, 2. Upstanding lugs 13 on the carriers 9 are pivotally connected to the leg 23 by links 14. Shock-absorbers, as indicated at 15, are pivotally connected between each end of the beam 12 and the leg 23. A motor 16, for example an hydraulic motor, drives one wheel 6 of each pair of wheels. Prime movers 17 mounted on the side members 3 and provide power for driving and operating the vehicle. A lifting frame 19 is carried by wire ropes 19' from winches 19'' mounted on the horizontal top members of the front and rear arch frames 1, 2 whereby the lifting frame may be raised and lowered. A spreader frame 20 of adjustable length is suspended from the lifting frame 19 and is fitted with twistlocks 20' for engagement in the top corner castings of containers. A control cab 22, FIG. 2, is carried by a vertically angularly movable boom 27 mounted on one of the legs 23 of the front arch frame 1. The boom 27 is operable to move the cab 22 between an elevated position, which is the position in which it is shown in full lines in FIG. 2, and a lowered position, as shown by broken lines in FIG. 2. The cab 22 lies within the area bounded by the vertical planes containing the side portions of the straddle carrier.

Referring to FIGS. 2, 3 and 4, the leg 23 of the front arch frame 1 which supports the cab 22 has upper and lower mounting pads 24, 25 to which is secured a robust, forwardly extending bottom bracket 26. One end of the boom 27, which is of generally channel-shaped section throughout its length, is pivotally mounted between opposite sides 28, FIG. 3, of the bottom bracket 26 at a forward lower location and two parallel links 29 each have one end pivotally mounted in the bracket 26 at an upper location. At their other ends the boom 27 and links 29 are pivotally connected to a support bracket 30 for the cab 22. The cab is secured to pads 32, 33 on the support bracket 30. A double-acting, hydraulic cab jack 31 has its piston rod end pivotally connected to a bracket 27' on and near the lower end of the boom 27 and its cylinder is pivotally connected to a bracket 23' on the leg 23. Extension of the cab jack 31 causes the boom 27 to be lowered; and contraction causes the boom to be raised. The boom 27 and parallel links 29 are so proportioned and their pivotal connections to the brackets 26 and 30 are so arranged as to provide a parallel linkage which ensures that the cab is not tilted significantly as it moves between the elevated and lowered positions. When the cab is in its elevated position the boom extends almost vertically upwards from the bottom bracket 26 and the cab is at a level near the top of the front arch frame 1 and when it is in the lowered position the boom extends forwards and downwards and the cab is disposed close to ground level and below the bottom bracket.

A top top bracket 34 is secured to mounting pads, 35, 36 on the leg 23. The lower part of the top bracket extends forwards and has a transversely extending abutment plate 37 for engagement by a corresponding abutment plate 38 on the boom 27 when the boom is in the raised position. Two similar locking assemblies 39 are secured at horizontally spaced positions to the front upper face of the top bracket 34. Each locking assembly, as best seen in FIG. 5, comprises a mounting bracket 40 having a forwardly extending upper pair of lugs 42 and a forwardly extending lower lug 43. The cylinder of a double-acting, pneumatic lock jack 44 is trunnion mounted between the lugs 42 so as to be pivotable relaive thereto. First and second pairs of links 45, 47 are pivotally connected at one end to the outer end of the piston rod 44' of the jack 44. The other ends of the first pair of links 45 are connected at pivot 46 to the lug 43. An upper, forked, end of a locking plate 48 is connected by a pivot pin 50 to the forward, free end of the lug 43. The other ends of the second pair of links 47 are connected at pivot 49 to the locking plate 48 at an intermediate part of the plate spaced from the pivot pin 50.

As drawn the lock jacks 44 of the locking assemblies 39 are in their extended positions with the locking plates 48 engaging the front of the abutment plate 38 of the boom 27 to clamp it against the abutment plate 37 of the top bracket 34, thereby mechanically locking the boom 27, and hence the cab 22 carried by the boom, in the elevated position. In this position each pivot 49 lies just above the plane containing the pivotal axes of the first pair of links 45 so that an over-centre lock is thus provided whereby each mechanism is mechanically locked. On contraction of the lock jacks 44 the pivots 49 pass downwardly through the plane containing the pivotal axes of the first pair of links 45 and the locking plates move angularly (clockwise as viewed in FIG. 3, anticlockwise as viewed in FIG. 5) away from the abutment plate 38 and hence release the boom 27 to allow it to be swung downwards.

A microswitch 61, FIG. 2, of the proximity type, hereinafter called "the cab UP switch", is mounted on the rear face of the cab 22 near the top of the cab. This switch closes when the cab is in the elevated position adjacent the leg 23. A similar switch 71, hereinafter called "the cab DOWN switch", is mounted on that face of the boom 27 which is rearwardly directed when the boom is lowered, FIG. 2, so as to be operated when the boom reaches its lowered position. The lowered position is defined by a mechanical stop (not shown) in the region 11 at the front of the carrier. Shock absorbers of any suitable kind may be incorporated in the mechanical stop or be provided in the region 11 to reduce impact loads when the boom reaches the lowered position. A third microswitch 95, hereinafter called "the cab LOCK switch", is carried by the top bracket 34 above the abutment plate 37, as indicated diagrammatically in FIG. 3, and is operated by the locking plate 48 as it moves into the locked position.

Referring now to the electrical circuit shown in FIG. 6, the positive terminal of a battery on the straddle carrier is connected by a conductor 60 to terminals 62, 63 of a change-over switch 64 by which either movement of the cab or drive of the carrier and operation of the lifting mechanism can be selected, first terminals 65, 66 of the cab UP and cab DOWN switches 61, 71 respectively and to one contact of each of relays 67, 68, 69. In a first position the change-over switch 64 connects terminal 62 to drive and lifting circuits, not shown, for the straddle carrier through terminal 70, conductor 72 and the contacts of relays 73, 74 which are connected in parallel. In a second position the change-over switch 64 connects terminal 63 to a solenoid valve associated with the lock jacks 44 by way of terminal 76, conductor 77, the contacts of relay 78 and diode 79, and also connects terminal 63 through conductors 77 and 83 respectively to solenoid valves 80, 82 connected respectively to first and second steering jacks 118, 123, FIG. 7, of the carrier and to opposite sides of the cab jack 31. Battery positive is also connected through a fuse 84 and conductor 85 to one side of each of two emergency switches 86, 87 which are connected in parallel. One switch 86 is in the cab and the other is located outside the cab on the structure of the carrier near ground level. The other sides of the switches 86, 87 are connected by a conductor 88 to an emergency solenoid valve 89 associated with the cab jack 31 and via a diode 90 to the solenoid valve 75.

A second terminal 92 of the cab UP switch 61 is connected to a coil 67' of the relay 67 by a conductor 93 and also a first terminal 94 of the cab LOCK switch 95. A second terminal 96 of the cab LOCK switch 95 is connected to a coil 68' which causes operation of the contacts of the relays 68 and 73.

A second terminal 97 of the cab DOWN switch 71 is connected to a coil 69' of the relay 69. This coil 69' also operates the contacts of the relay 74 and 78. Second contacts of relays 67, 68, 69 are connected to respective indicator lamps 98, 99, 100 which are located in the cab 22. The other sides of the solenoid valves 75, 80, 82, 89, relay coils 67', 68', 69' and indicator lamps 98, 99, 100 are connected to battery negative by a conductor 102.

When the cab 22 is in the elevated position, but not locked in that position, the cab UP switch 61 is closed and so the coil 67' is energised. The contacts of relay 67 close and the lamp 98 lights up to indicate to the operator that the cab is fully elevated. When the cab is locked in the elevated position and the cab LOCK switch 95 closes, the coil 68' is thereby energised and the contacts of the relays 68, 73 are closed, respectively to illuminate the lamp 99, which indicates that the cab is locked, and put the drive and lifting circuits of the carrier into a condition in which they can be energised if the change-over switch 64 is subsequently moved to the first position by the operator. When the change-over switch 64 is in that position as shown in FIG. 6, the solenoid valves 80 and 82 are, of course, de-energised and the straddle carrier may be driven and steered and the load-lifting mechanism operated in the normal manner. Subsequent operation of the change-over switch 64 to move it to the second-mentioned position removes the electric power supply for the drive and lifting mechanism through the closed contacts 73 and completes circuits to energise the solenoid valves 75, 80 and 82.

The solenoid 75 associated with the lock jacks 44 is of the two-position, spring return type. When de-energised it admits compressed air from a supply, not shown, on the straddle carrier to the full area sides of the lock jacks 44 to extend them into the position in which the locking plates 48 lock the cab in the elevated position. When it is energised the solenoid valve 75 changes over and this results in exhaustion of air from the full area side of the lock jacks 44, and admission of compressed air to the annular area side of the lock jacks to close them, thereby withdrawing the locking plates 48 and unlocking the cab. Release of the locking assemblies 39 opens the cab LOCK switch 95 and the lamp 99 is extinguished.

Energisation of the two other solenoid valves 80 and 82 permits the passage of pressure liquid to and from the cab jack 31 for moving the cab 22 and at the same time cuts off supply to and from steering jacks for the straddle carrier, as will be described hereafter with reference to FIG. 7.

For operation of the cab jack 31 to lower the cab 22, the change-over switch 64 is moved to the second position which energises the solenoids 80 and 82 for extending the cab jack, and energises the solenoid 75 for releasing the locking members 39, and the cab UP switch 61 is opened, and hence the lamp 98 is extinguished. When the cab reaches its lowered position the cab DOWN switch 71 is automatically closed in the manner previously mentioned and energises the coil 69′ to close the contacts of relays 69, 74 which lights up the lamp 100, thus indicating to the operator that the cab is fully lowered, and puts the drive and lifting circuits of the straddle carrier into conditions to be energised subsequently if the change-over valve 64 is moved to the first position by the operator. Also the contacts of relay 78 are opened so that the solenoid valve 75 connected to the lock jacks 44 is de-energised. For operation of the cab jack 31 to raise the cab, with the change-over switch in the second position, the sequence is reversed. The cab DOWN switch 71 is opened, so extinguishing the lamp 100, the contacts of the relay 74 are opened and the contacts of relay 78 are closed. The solenoid valve 75 is re-energised. When the cab reaches the elevated position the cab UP switch 61 closes, as previously stated, causing lamp 98 to light up. Subsequent operation of the change-over switch 64 de-energises the solenoid valve 75 and accordingly the lock jacks extend in the manner described to lock the cab in the elevated position.

In the event of a failure of the normal provision for lowering the cab the operator may close the emergency switch 87 in the cab, or the emergency switch 86 located near ground level on the carrier may be closed by someone on the ground, to effect lowering of the cab. Closure of either emergency switch 86, 87 causes energisation of the solenoid valves 75 and 89 associated with the lock and cab jacks. The latter solenoid valve cross-connects the full area and annular area sides of the cab jack 31 to permit controlled lowering of the cab as will now be described with reference to the hydraulic circuit shown in FIG. 7.

As shown, a motor 102, which may be an engine for driving the straddle carrier, is drivingly connected to a pump 103 which takes suction from an hydraulic tank 104 through a conduit 105. The pump 103 delivers pressure liquid to a control valve 106 by way of a bypass filter 107, conduit 108, check valve 109 and supply conduit 110. The pressure is controlled by a pilot-operated, relief valve 112 connected to conduit 108 which relieves back to tank 104 through a conduit 113. The control valve 106 is connected to the tank 104 by a return conduit 114 and to the solenoid valves 80, 82 by conduits 115, 116 respectively. The solenoid valve 80 is connected to the tank 104 by a conduit 117, to the annular area side of the first steering jack 118 of the straddle carrier by a conduit 119 and to the full area side of the cab jack 31 by a conduit 120. The solenoid valve 82 is connected to the tank 104, to the annular area side of the second steering jack 123 and to a counterbalance valve 125 by conduits 122, 124 and 126 respectively. The counterbalance valve 125 is connected to the conduit 120 by a branch conduit 127 and to the annular area side of the cab jack 31 by a conduit 128. It incorporates a check valve 129 which is connected across it. The emergency solenoid valve 89 is also connected to the conduit 120 through a check valve 130 and by means of a variable restrictor 132 to the conduit 128 leading to the annular area side of the cab jack 31. The solenoid valves 80, 82 and 89 are all shown in their de-energised states. The full area sides of the steering jacks 118, 123 are joined by a connecting conduit 133 and both the full and annular area sides of the second steering jack 123 are connectable by a valve 134 which is normally closed and is provided for setting up the steering jacks.

The control valve 106 is shown in the neutral position and in this position pressure liquid delivered by the pump 103 circulates through conduit 110, control valve 106 and back to tank 104. Operation of a control member 135 of the control valve 106 in the cab, for example a steering wheel, in a first direction causes the conduit 110 to be connected through the control valve to the solenoid valve 82 by way of the conduit 116. Simultaneously the solenoid valve 80 is connected to the tank 104 through the conduit 115, through a passage 136, pump 137 and passage 138 all of which are included in the control valve 106 and through the conduit 114. When the control member 135 is moved in a second, opposite, direction the control valve 106 connects the conduit 110 leading from the pump 103 connected to the motor 102 to the conduit 115 and the conduit 116 for the solenoid 82 to the conduit 114 through the passage 138, pump 137 and the passage 136. The rate of flow of liquid through the control valve 106 is dependent on the rate at which the pump 137 is rotated by the control member 135 so that the operator has full control over the rate of movement of the steering jacks 118, 123 and of the cab jack 31. With the solenoid valves 80, 82 de-energised, as shown, the pressure liquid from the motor-driven pump 103 passes to the steering jacks in accordance with the operation of the control member 135. Thus when the control member 135 is moved in the first-mentioned direction the pressure liquid passes through the solenoid valve 82 to the second steering jack 123 and causes that jack to contract. This in turn causes extension of the first jack 118 and the liquid expelled therefrom passes back to the tank 104 through the conduit 119, the solenoid valve 80 and the conduit 115. Similarly when the control member 135 is moved in the other direction the first steering jack 118 is caused to contract and the second steering jack 123 extends. The jacks are connected through mechanical linkages to the steerable wheels of the carrier.

On energisation of the solenoid valves 80, 82 the conduits 115, 116 are disconnected from the steering jacks 118, 123 and connected instead to the cab jack 31 for effecting movement of the cab. Pressure liquid in the conduit 116, which is connected by operation of the control valve 106 to the conduit 110, passes through solenoid valve 82 to the annular side of the cab jack 31 through the conduit 126, check valve 129 and the conduit 128. Liquid expelled from the full area side of the cab jack 31 passes through the conduit 120, solenoid valve 80, and conduit 115 which is connected by the control valve (including its passages 136, 138 and pump 137) to the return conduit 114, and so back to the tank 104. The resultant contraction of the cab jack 31 raises the cab 22. To lower the cab, the control valve is moved to a condition in which it couples the supply conduit 110 to the conduit 115. Pressure liquid in the conduit 115 then passes to the full area side of the cab jack 31, to lower the cab, by way of the solenoid valve 80 and conduit 120. The liquid expelled from the annular side of the cab jack passes through conduit 128, counterbalance valve 125, conduit 126, solenoid valve 82, and by way of conduit 116 to the control valve 106 where again the liquid has to pass through the pump 137 by way of passages 138 and 136 before it reaches the return conduit 114, which returns it to the tank 104. The pressure liquid of conduit 115 is also supplied through the branch conduit 127 to the main pilot connection on the counterbalance valve 125 to open it and so allow liquid to be expelled through that valve from the annular area side of the cab jack 31. If the pressure in the branch conduit 127 drops below a predetermined value the counterbalance valve 125 closes. In this way the lowering movement of the cab is controlled in a safe manner. The speed of raising and lowering the cab is, as has been described, controlled by the operator according to the rate at which he rotates the pump 137 of the control valve 106 by operation of the control member 135.

When the emergency solenoid valve 89 is energised the full and annular area sides of the cab jack 31 are connected through the conduit 128, the variable restrictor 132, the emergency solenoid valve 89, the check valve 130 and conduit 120. The combined weight of the cab 22 and the boom 27 then causes the cab jack 31 to be extended and the speed of movement is controlled by the variable restrictor 132 which is set to an appropriate value to ensure safe lowering. The liquid expelled from the annular area side of the cab jack 31 is thus transferred to the full area side, additional liquid being sucked in from the tank 104 by way of conduit 117 to fill the full area side.

The pilot connection to the counterbalance valve 125 from the conduit 128 enables the valve 125 to function as a relief valve and relieve excessive pressure from the annular area side of cab jack 31. The counterbalance valve 125, its check valve 129, the variable restrictor 132, the emergency solenoid valve 89 and the check valve 130 form a single unit at the cab jack 31 as indicated at 140 in FIG. 4, so as to minimise the possibility of a failure which would permit uncontrolled lowering of the cab.

It will have been observed that during raising and lowering of the cab 22 there is no electrical power supply for drive of the straddle carrier or for load lifting. However, when the cab is in either of the elevated and lowered positions the change-over switch 64 can be placed in the condition shown in FIG. 6 to permit drive of the carrier and lifting of a load. Hence the carrier may be operated with the cab in the elevated or in the lowered position.

When the cab is in the lowered position it is readily accessible to the operator from the ground and also for servicing.

In a modified construction, not shown, a subsidiary lifting mechanism may be interposed between the cab support bracket 30 and the boom 27 and links 29. This may be of a type such as is commonly used on fork lift trucks in which a hydraulic ram, pulleys and chains are employed. The cab may be arranged to be raised and lowered by this lifting mechanism independently of the main lifting movement provided by the boom 27. It will enable the operator to adjust, within limits, the position of his cab when elevated, or when lowered, so as to improve still further his field of view for manoeuvring and operating the vehicle.

As a further modification to improve the field of view of the operator and hence the ease of operation of the vehicle, the cab may be mounted on a turntable or other vertical pivot so as to be capable of rotation through the angle in the horizontal direction, for example to present the cab sideways to the normal direction of travel of the straddle carrier. The rotation may be accomplished by, for example, operation of an hydraulic jack or an hydraulic or electric motor.

In the embodiment described the cab 22 is mounted for a vertical swinging movement at the front of the vehicle. It will be understood that it could equally well be mounted at the rear, if desired.

I claim:

1. A straddle carrier comprising a power driven wheeled structure, means for steering said wheeled structure, power-operated, load-lifting equipment mounted on said wheeled structure, a control cab supported by said wheeled structure and movable relative thereto between at least two alternative positions of which one is an elevated position from which the straddle carrier is controlled when in use, and the other is a lowered position in which said control cab is located at or adjacent to ground level where it is available for access and servicing, and selectively operable power means carried by said wheeled structure which are operatively connected to said control cab whereby said control cab is moved between said alternative positions and which includes manually controlled means for varying operation of said power means and thereby the speed of movement of said control cab between said alternative positions.

2. A straddle carrier according to claim 1 wherein said manually controlled means is selectively and alternatively connected to said steering means for controlling said steering means.

3. A straddle carrier according to claim 1 wherein a boom is pivotally mounted on said wheeled structure and carries said control cab, said power means includes a fluid-operated jack mounted on said wheeled structure and connected to said boom for moving said boom angularly, thereby to move said control cab between said alternative positions, and said manually controlled means comprises a pump through which fluid for effecting operation of said jack passes and which has a hand control for varying the speed of operation of said pump during operation of said pump, the construction and arrangement being such that variation of the speed of operation of said pump varies the rate of flow of fluid to and from said jack, and thereby varies the speed of operation of said jack.

4. A straddle carrier according to claim 1 wherein a boom is pivotally mounted on said wheeled structure and carries said control cab, said steering means is fluid operated, and said power means includes a fluid-operated jack mounted on said wheeled structure and operatively connected to said boom for moving said boom angularly, thereby to move said control cab between said alternative positions, and valve means having a control in said control cab and through which the fluid for operating said steering means and said jack passes, said valve means having alternative effective conditions in one of which it permits the fluid to flow to or from said steering means to operate said steering means and in another of said effective conditions said valve means permits the fluid to flow to or from said jack to operate said jack, the arrangement being such that said steering means and jack cannot be operated simultaneously.

5. A straddle carrier according to claim 1 wherein power-operated means are drivably connected to said wheeled structure and said load-lifting equipment and are adapted to be disabled whilst said control cab is being moved between said alternative positions.

6. A straddle carrier according to claim 5 wherein a single actuator is provided in said control cab which is operatively connected to said power-operated means and to said selectively operable power means, said actuator having two operable conditions in a first one of which said power-operated means is made effective, and in a second one of said operable conditions said power means is made effective for moving said control cab.

7. A straddle carrier according to claim 6 wherein said power-operated means includes an electrical circuit having switches which move with said control cab, and said wheeled structure has parts thereon which are adapted to operate said switches when said control cab is moved into said alternative positions thereby to put said circuit into condition for making said power-operated means effective when said actuator is in said first condition, said switches being inoperative when said control cab is being moved between said alternative positions.

8. A straddle carrier according to claim 1 wherein locking means is provided for locking said control cab in said elevated position, said locking means comprising releasably interengageable component parts of which one part is fixed to said wheeled structure and another part is movable with said control cab, and said selectively operable power means includes a control which is connected to said locking means for releasing said locking means when said power means is operated to move said control cab away from said elevated position.

9. A straddle carrier according to claim 8 wherein said locking means comprises an element movable with said control cab, a mounting fixed to said wheeled structure, means mounted on said wheeled structure and connected to said linkage for operating said linkage, and a locking plate carried by said linkage and movable by said linkage relative to said mounting between an inoperative position and an operative position in which it engages with said element and prevents movement of said control cab away from said elevated position, said linkage including links which move with over-centre action relative to one another when said linkage is operated to move said locking plate between said inoperative and operative positions such that they cause said linkage to be locked mechanically against movement when said locking plate is in said operative position.

10. A straddle carrier according to claim 9 wherein said means for operating said linkage comprises a fluid-operated jack.

11. A straddle carrier according to claim 9 wherein said means for operating said linkage comprises a fluid-operated jack, and an actuator is provided in said control cab which is operatively connected to said selectively operable power means and which has a first operable condition for operating said jack to cause said locking plate to be moved by said linkage to said operative position, and a second operable condition for operating said jack to move said locking plate to said inoperative position and making said power means effective for moving said control cab.

12. A straddle carrier according to claim 1 wherein emergency means is provided operable at least from within said control cab and selectively connectable to said power means whereby lowering of said control cab from said elevated position can be effected in the event that normal control of said power means fails.

13. A straddle carrier according to claim 12 wherein said power means comprises a fluid-operated jack mounted on said wheeled structure and connected to said control cab for moving said control cab between said alternative positions, said jack having a fluid line extending between opposite sides thereof, and said emergency means comprises a valve in said fluid line which has two operable conditions in one of which said valve prevents fluid from passing along said fluid line between said opposite sides of said jack, and in the other one of said conditions said valve permits fluid to pass through said fluid line from one side of said jack to the other thereby to permit movement of said jack which lowers said control cab.

14. A straddle carrier according to claim 13 wherein there is a variable restrictor in said fluid line by means of which the rate of flow of fluid through said fluid line can be varied to adjust the speed of lowering of said control cab.

15. A straddle carrier according to claim 1 wherein said power means comprises a main power means and a subsidiary power means each operable to move said control cab over part of its full range of movement.

16. A straddle carrier according to claim 15 wherein said power means moves said control cab between said alternative positions and said subsidiary power means provides limited adjustment of said control cab in at least one of said alternative positions.

17. A straddle carrier according to claim 1 wherein said control cab is disposed at one end of said wheeled structure adjacent one of two opposite sides of said wheeled structure and is normally located between vertical planes containing said two opposite sides.

* * * * *

UNITED STATES PATENT OFFICE

CERTIFICATE OF CORRECTION

Patent No. 3957165 Dated May 18, 1976

Inventor(s) Richard Terence Smith

It is certified that error appears in the above-identified patent and that said Letters Patent are hereby corrected as shown below:

Claim 9, line 4, after "structure," insert

-- a linkage connected to said mounting, --

Signed and Sealed this

*Eighth* Day of *August 1978*

[SEAL]

*Attest:*

RUTH C. MASON
*Attesting Officer*

DONALD W. BANNER
*Commissioner of Patents and Trademarks*